(12) United States Patent
Groenendaal et al.

(10) Patent No.: US 8,099,425 B2
(45) Date of Patent: Jan. 17, 2012

(54) RELATIONAL MODEL FOR MANAGEMENT INFORMATION IN NETWORK DEVICES

(75) Inventors: Johan van de Groenendaal, Marlborough, MA (US); Amitava Chakraborty, Acton, MA (US)

(73) Assignee: Computer Associates Think, Inc., Islandia, NY (US)

( * ) Notice: Subject to any disclaimer, the term of this patent is extended or adjusted under 35 U.S.C. 154(b) by 791 days.

(21) Appl. No.: 10/786,863

(22) Filed: Feb. 24, 2004

(65) Prior Publication Data

US 2004/0181541 A1 Sep. 16, 2004

Related U.S. Application Data

(60) Provisional application No. 60/454,966, filed on Mar. 14, 2003.

(51) Int. Cl.
*G06F 7/00* (2006.01)
*G06F 17/30* (2006.01)
(52) U.S. Cl. ...................................... 707/760
(58) Field of Classification Search ............... 707/104.1, 707/1–3, 103, 100, 760, 102; 715/501.1
See application file for complete search history.

(56) References Cited

U.S. PATENT DOCUMENTS

| | | | | |
|---|---|---|---|---|
| 5,317,742 A * | 5/1994 | Bapat | ............................. | 707/714 |
| 5,953,716 A * | 9/1999 | Madnick et al. | ....................... | 1/1 |
| 5,961,594 A * | 10/1999 | Bouvier et al. | ................ | 709/223 |
| 6,122,639 A * | 9/2000 | Babu et al. | ................. | 707/103 R |
| 6,219,708 B1 * | 4/2001 | Martenson | ..................... | 709/226 |
| 6,226,649 B1 * | 5/2001 | Bodamer et al. | ............... | 709/203 |
| 6,611,866 B1 * | 8/2003 | Goldman | ....................... | 709/224 |
| 6,615,201 B1 * | 9/2003 | Seshadri et al. | ................... | 707/2 |
| 6,778,987 B1 * | 8/2004 | Wynblatt et al. | ................. | 707/10 |
| 6,816,873 B2 * | 11/2004 | Cotner et al. | ................... | 707/201 |
| 6,961,728 B2 * | 11/2005 | Wynblatt et al. | ....................... | 1/1 |
| 6,981,036 B1 * | 12/2005 | Hamada | ......................... | 709/223 |
| 7,111,206 B1 * | 9/2006 | Shafer et al. | ..................... | 714/48 |
| 7,124,413 B1 * | 10/2006 | Klemm et al. | ................. | 719/313 |
| 7,254,781 B1 * | 8/2007 | Land et al. | ...................... | 715/760 |
| 7,373,335 B2 * | 5/2008 | Cleghorn et al. | .................. | 707/3 |
| 2002/0143755 A1 * | 10/2002 | Wynblatt et al. | ................... | 707/3 |
| 2004/0064502 A1 * | 4/2004 | Yellepeddy et al. | ........... | 709/203 |
| 2005/0278442 A1 * | 12/2005 | Motoyama et al. | ............ | 709/224 |

FOREIGN PATENT DOCUMENTS

| | | |
|---|---|---|
| EP | 0810755 | 12/1997 |
| WO | WO0076129 | 12/2000 |

* cited by examiner

*Primary Examiner* — John R. Cottingham
*Assistant Examiner* — Michael Pham
(74) *Attorney, Agent, or Firm* — Baker Botts L.L.P.

(57) ABSTRACT

Apparatuses and methods for system management in a heterogeneous environment are provided. For example, relational query from a software application requesting management information from a specified information source is received and translated to native protocol messages according to an access protocol associated with the information source. The native protocol messages are handled as a transaction with the information source and a result of the transaction is returned to the software application.

19 Claims, 6 Drawing Sheets

RELATIONAL MODEL FOR MANAGEMENT INFORMATION IN NETWORK DEVICES

CROSS-REFERENCE TO RELATED APPLICATIONS

This application claims the benefit of commonly assigned U.S. Provisional Application No. 60/454,966, filed Mar. 14, 2003 and entitled "RELATIONAL MODEL FOR MANAGEMENT INFORMATION IN NETWORK DEVICES".

TECHNICAL FIELD

This application relates to system management. In particular, the application relates to use of a relational model for management in a heterogeneous environment.

DESCRIPTION OF RELATED ART

The term "heterogeneous environment", as used herein, refers to a network environment in which the plural devices and other information sources on the network have plural access protocols, which may be vendor-specific and/or require a proprietary format.

The term "network management", as used herein, refers to the ability to monitor, control and configure devices on a network [for example, a computer network, a Storage Area Network (SAN), a wired or wireless telecommunicative network, etc.] remotely via the network.

The term "management application", as used herein, refers to software that is used to perform network management, which includes communicating with information sources, such as element managers, devices [for example, computers, servers, routers, bridges, hubs, switches, printers, modem banks, PBXs (private branch exchanges), access points, other telecommunicative devices, etc.] attached to the network and agents on the devices, in order to perform management functions (such as fault management, configuration management, accounting management, performance management, security management, etc.).

Fault management is typically one of the network management functions. Faults can manifest themselves as persistent or transient events. Some types of error can appear even in a well-functioning network. Fault management provisions typically include means for detection of persistent faults and for automatic correction of faults, and may generate messages after detecting faults on a resource (such as through event notification). Fault management functions can include fault detection, fault correction, fault isolation, network recovery, alarm handling, alarm filtering, alarm generation, diagnostic testing, error logging, error handling, error statistics, etc.

Configuration management can be used to locate resources, including failed ones, and keep track of types of resources and their details. Configuration management allows managed resources to be activated and deactivated in a controlled manner, and provides support services for keeping the system and resources operational. Configuration management functions can include resource initialization, network provisioning, auto discovery, backup and restore database handling, resource shutdown, change management, inventory asset management, copy configuration, remote configuration, job initiation and execution tracking, automated software installation and information distribution, etc.

Accounting management provides for tracking service usage and informing relevant users and managers regarding usage of resources and associated costs. Accounting management functions can also include setting limits on usage of resources, taking corrective action when a quota is exceeded, combining costs for multiple resources, performing audits, etc.

Performance management gathers network statistics (such as utilization and error rates), evaluates system performance under normal and abnormal condition, and modifies mode of system operation. Additional performance management functions can include collecting and analyzing performance data, generating performance reports, reporting problems, capacity planning, maintaining historical logs, etc.

Security management typically strives to minimize unauthorized or accidental access to network control functions, ensure legitimate network use, and maintain data privacy integrity and auditability. Security management functions can also include selective access to resources, maintaining access logs, reporting security alarm or event, responding to security breaches and attempts, security audit trail logging, etc.

Many devices and other information sources on a network can provide information for performing network management functions. The information sources may be accessed through different access protocols, such as SNMP (Simple Network Management Protocol), CMIP (Common Management Information Protocol), Telnet/CLI (Command Line Interface), HTTP (Hypertext Transfer Protocol), SQL (Structured Query Language), SOAP (Simple Object Access Protocol), etc. Each of the protocols mandates how the information source is organized, along with the syntax of the access protocol. In addition, network devices support one or more of the access protocols, and the information format provided through the protocols is not necessarily the same amongst the protocols. For example, on some routers, some fault information is provided through SNMP, while other fault information is provided via CLI. Therefore, it is usually not possible to retrieve all fault information through a single access protocol.

The access logic which conventional management applications use to access a network device or other information source is typically tied to management information organization of the device, which in turn is dependent on the constructs provided by the underlying management protocol used by the device. Therefore, management applications typically have a number of different modules in order to support different protocols. Also, multiple modules are included to handle proprietary information in different formats corresponding to respective different devices or information sources. The multiple proprietary access mechanisms often are hard to comprehend and difficult to extend to support devices with different management interfaces. Hard coding of information in multiple formats which is employed in conventional management applications leads to non-scalable, difficult-to-maintain applications. In addition, applications are restrained by the constructs provided by the underlying management protocol, which typically does not include more advanced constructs, such as for queries (for example, a JOIN construct).

Conventional network management tools which support multi-access-protocol, multi-vendor devices do not use a common structural model of management information. Every device has a corresponding module to handle its management information. The module incorporates the access mechanism of the management protocol supported by the device. The module design is complex, especially if data needs to be procured using multiple access protocols. Although the functionality of managing multi-vendor devices supporting various access protocols is achieved, the solution is not scalable and difficult to maintain.

As an example, access points are network devices that bridge two network segments, such as a wireless network to a wired Local Area Network or other wired infrastructure. An access point generally has multiple management interfaces which are based on, for example, SNMP, HTTP/web and Telnet/CLI management protocols. Each of these management protocols not only defines management information access logic but also mandates specified data organizations. Therefore, a management application which needs to communicate with access points is typically tied to the management protocol access logic. Since multiple protocols generally are used by the plural devices on a network, a management application typically must support different access logics in order to communicate with the plural devices. For example, a management application typically has a module to communicate with access points which use SNMP, a second module for access points which use HTTP, a third module for access points which use Telnet, etc. Furthermore, most access points have a proprietary extension for management support, and the management information typically has a proprietary format.

In addition, management protocols do not always provide the relevant access constructs. For example, one may desire to select a subset of the Cartesian products of two tables in an access point supporting SNMP. There is no easy way to accomplish this task using native SNMP.

As another example, an element manager (or element management system) manages a portion of a network, such as one or more network devices (or elements) of a specific type. Element managers, like access points, generally include a number of different interfaces which range from, for example, interfaces for rudimentary FTP (file transfer protocol) access to information to more modern interfaces which are based on XML and SOAP. Implementation of the access protocol and data organization is vendor specific and no standards exist to define how an element manager should communicate. The plural access points and element managers on a network are typically manufactured by different vendors and support different sets of management protocols. The problems associated with managing access points and other network devices are similarly applicable to managing network devices through element managers.

There is a need for improved tools for network management in a heterogeneous environment.

SUMMARY

The present application provides an apparatus for system management in a heterogeneous environment. In one embodiment, the apparatus includes a relational interface, a relational mapper and a protocol transaction handler. The relational interface is adapted to receive a relational query from a software application requesting management information from a specified information source. The relational mapper translates the relational query received through the relational interface from the software application, to native protocol messages according to an access protocol associated with the information source. The protocol transaction handler is adapted to handle the native protocol messages as a transaction with the information source and return a result of the transaction to the software application.

The present application also describes a relational modeler apparatus which, according to one embodiment, is adapted to translate a relational query from a software application requesting management information from a specified information source, to native protocol messages according to an access protocol associated with the information source, wherein said native protocol messages is handled as a transaction with the information source The application also provides a method for system management in a heterogeneous environment. In one embodiment, the method includes receiving a relational query from a software application requesting management information from a specified information source, translating the relational query received through the relational interface from the software application, to native protocol messages according to an access protocol associated with the information source, and handling the native protocol messages as a transaction with the information source and returning a result of the transaction to the software application.

BRIEF DESCRIPTION OF THE DRAWINGS

The features of the present application can be more readily understood from the following detailed description with reference to the accompanying drawings wherein.

DETAILED DESCRIPTION

This application provides tools (in the form of methodologies and apparatuses, collectively referred to herein as "subject management tools") for network management in a heterogeneous environment. Each tool may be a program of instructions stored on a machine readable medium and/or transmitted via a computer network or another transmission medium.

Figure 1A:
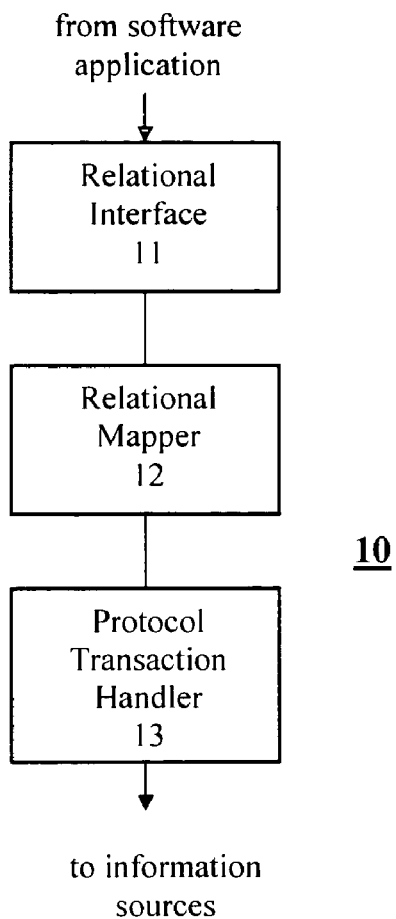
FIG. 1A shows a block diagram of an apparatus, according to one embodiment of the present application, for system management in a heterogeneous environment.
Figure 1B:
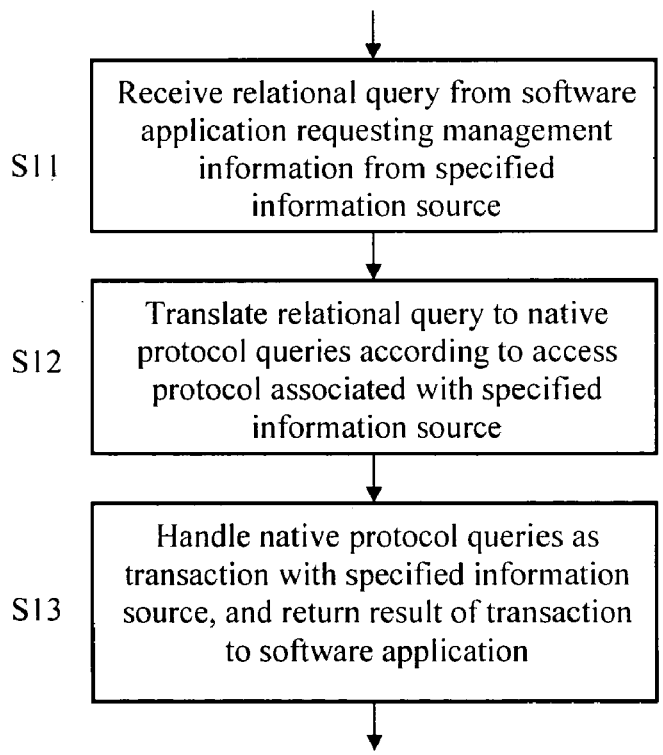
FIG. 1B shows a flow chart of a method for system management in a heterogeneous environment, in accordance with one embodiment of the present application.

An apparatus and a method for network management in a heterogeneous environment, according to one embodiment, are described below with reference to FIGS. 1A and 1B.

An apparatus 10 comprises a relational interface 11, a relation mapper 12 and a protocol transaction handler 13. A method for network management in a heterogeneous environment may include receiving a relational query through the relational interface 11 from a software application requesting management information from a specified information source (step S11), translating through the relation mapper 12 the relational query received through the relational interface 11 from the software application, to native protocol messages according to an access protocol associated with the information source (step S12), and handling the native protocol messages through the protocol transaction handler 13 as a transaction with the information source and returning a result of the transaction to the software application (step S13).

The relational mapper can include a relational model of the information source. The management information in the network device and information sources may be visualized as a virtual relational database. Visualizing the management information as a relational model allows the subject management tools to leverage the robust mechanisms of relational query languages, like SQL. For example, a generic network management framework associated with a SQL-like language (which may be specified in XML) may be provided to abstract the access protocols from the network management applications. SQL-like constructs are used for accessing data from network devices in a seamless way. Applications can base their access logic on SQL-like queries. Powerful management access logic can be specified through the SQL-like language. The SQL-like statements are internally translated into a transaction of protocol messages. The SQL-like logic may be expressed in XML. Since the modeling may be expressed in XML, proprietary information can be easily expressed.

The relational query is preferably independent of management and/or access protocols. Thus, application access mechanisms can be detached from the constraints imposed by management protocols, and applications can be shielded from the underlying management protocols. The translation of the relational query to native protocol messages is an abstraction transparent to said software application. In addition, a form of the relational query does not depend on the access protocol to which the relational query is to be translated.

The subject management tools, which are highly scalable, efficient, robust and easy-to-maintain, may be employed by applications in a multi-vendor multi-access-protocol environment. The subject management tools obviate the need to maintain separate modules based on management protocol or devices.

In addition, the relational mapper can be adapted to translate a query to plural messages corresponding to plural access protocols. The subject management tools allow for multiple access protocols to be used as part of a single management function (for example, a select operation can combine data from SNMP and HTTP in a single request). The management function is internally translated into a transaction of actual protocol messages.

The subject management tools may be extended beyond handling network devices and can be adapted to obtain information from other sources where relevant information resides. Information in network devices and/or element management systems are handled in a similar manner.

The subject management tools can be adapted for almost all spheres of system and network management. Applications using the subject management tools are shielded from the vagaries of management protocols and are therefore scalable with less maintenance headaches.

In addition, the relational mapper is expandable to receive queries directed to additional information sources which use other protocols different from said access protocol, transparent to said software application. The subject management tools allow for the addition of new protocols and information sources to be introduced without affecting the applications using the tools.

The subject management tools may be incorporated in access mechanisms for managing network devices in a heterogeneous telecommunications environment. For example, the tools may be used to support a heterogeneous group of access points, as well as integrate data from plural third party element managers. The management information in, for example, access points and element managers are viewed independent of the management and access protocols.

An embodiment in which the subject management tools is used by network management applications to obtain information from network information sources for management functions (for example, fault, configuration, accounting, performance, security, etc.) is described below. However, it should be apparent that the subject management tools can be used in a multitude of applications apart from typical network management, for which management information is fetched across a network. The subject management tools can be used in any applications working on any kind of management information in network devices and their element managers.

Management applications use different types of management interfaces to access data and communicate with network devices and other information sources. For example, different types of management interfaces may be associated with specific access protocols, such as SNMP, HTTP/Web, Telnet/CLI, etc.

A number of aspects of the management interfaces have a bearing on the management applications. One aspect is access logic. For example, SNMP provides rudimentary constructs while HTTP/HTML and Telnet/CLI rely completely on the native transport mechanisms of HTTP and Telnet, respectively.

Figure 2:
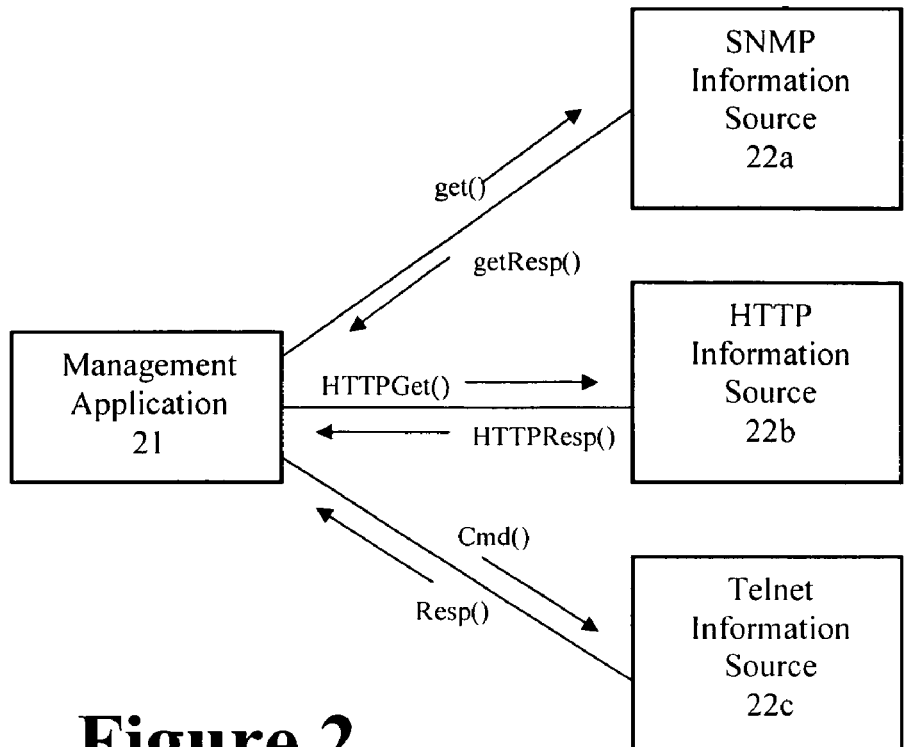
FIG. 2 shows a schematic representation of a communication scheme between a management application, on the one hand, and on the other hand plural information sources through respective different management interfaces in a heterogeneous environment.

The use of protocol-specific constructs is illustrated in FIG. 2. Information sources 22*a*, 22*b* and 22*c* support the SNMP, HTTP/HTML and Telnet/CLI protocols, respectively. Management application 21 uses the native access logic of the management interface while communicating with each information source.

Another aspect of management interfaces is that the interfaces mandate data organization view. For example, SNMP provides a tabular structure of management data while HTTP/HTML provides SGML or XML (XHTML) data and therefore a flat file structure.

To illustrate the subject management tools, consider as an example interface information in the information sources. The interface information typically includes three fields, interface index, interface type, interface address.

For an information source conforming with the SNMP protocol, management data is organized as tables. Therefore, interface information in information source 22*a* is provided in a table, such as an interface table as shown below.

| IfIndex | IfType | IfAddress |
| --- | --- | --- |
|  |  |  |

IfIndex corresponds to an SNMP interface index field. IfType corresponds to an SNMP interface type field. IfAddress corresponds to an SNMP interface address field.

SNMP tables and attributes are expressed in dotted decimal notation. The table identifier in the SNMP interface table is in dotted decimal notation, for example, 1.3.6.1.4.2. The attribute identifiers are also in dotted decimal notation. For example, ifIndex is 1.3.6.1.4.2.1.1, ifType is 1.3.6.1.4.2.1.2 and ifAddress is 1.3.6.1.4.2.1.3. SNMP access methods are used to access the attributes either individually or in a list.

Figure 3:
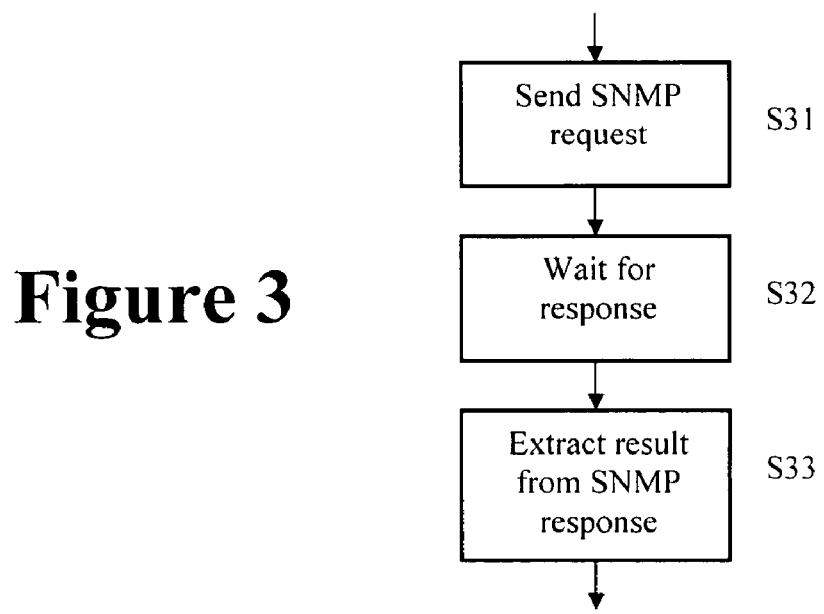
FIG. 3 shows a flow chart showing application logic for communicating with an information source using the SNMP protocol.

For example, if the application wants to access the ifType attribute, the application logic is as follows (corresponding to the flow of control shown in FIG. 3):

construct SNMP_Get(1.3.6.1.4.2.1.2.x) [step S31];
// x is a value but not relevant for the discussion here
wait for response from information source 22a [step S32]; and
extract value of Type from response message SNMP_Response( ) [step S33].

The management application uses SNMP-specific semantics in the application's logic while communicating with information source 22a.

Information in an HTTP/HTML interface is structured in SGML or XML. HTML supports multiple representations, such as forms, tables, etc.

In the example below, it is assumed that the interface information is in an HTML table structure. The application logic is as follows (corresponding to the flow of control shown in FIG. 4):

construct HTTP_Get(http://100.100.100.100/Interface) [step S41]
// includes URI for interface page
wait for response from information source 22b [step S42]; and
extract value of Type from the form returned by HTTP_Resp( ) [step S43].

The response is similar to the following:

```
<html>
<head>
<title>Router Ethernet Port</title>
<script LANGUAGE="JavaScript">
<!--
-- some data
</head>
<body bgcolor="#FFFFFF" leftmargin="4" Text="black" LINK="black"
ALINK="black" VLINK="black">
<div align="left">
<table border="0" cellspacing="1" align="left" width="600">
-- some data
<tr><th>Interface Index</th><th>Interface Type</th><th>Interface
Address</th>
<tr><td><font size="2"> 1 </font></td><td><font size="2">3
</font></td>
<td><font size="2">10.10.10.10</font></td></tr>
-- some data
</table>
</div>
</body>
</html>
```

Figure 4:
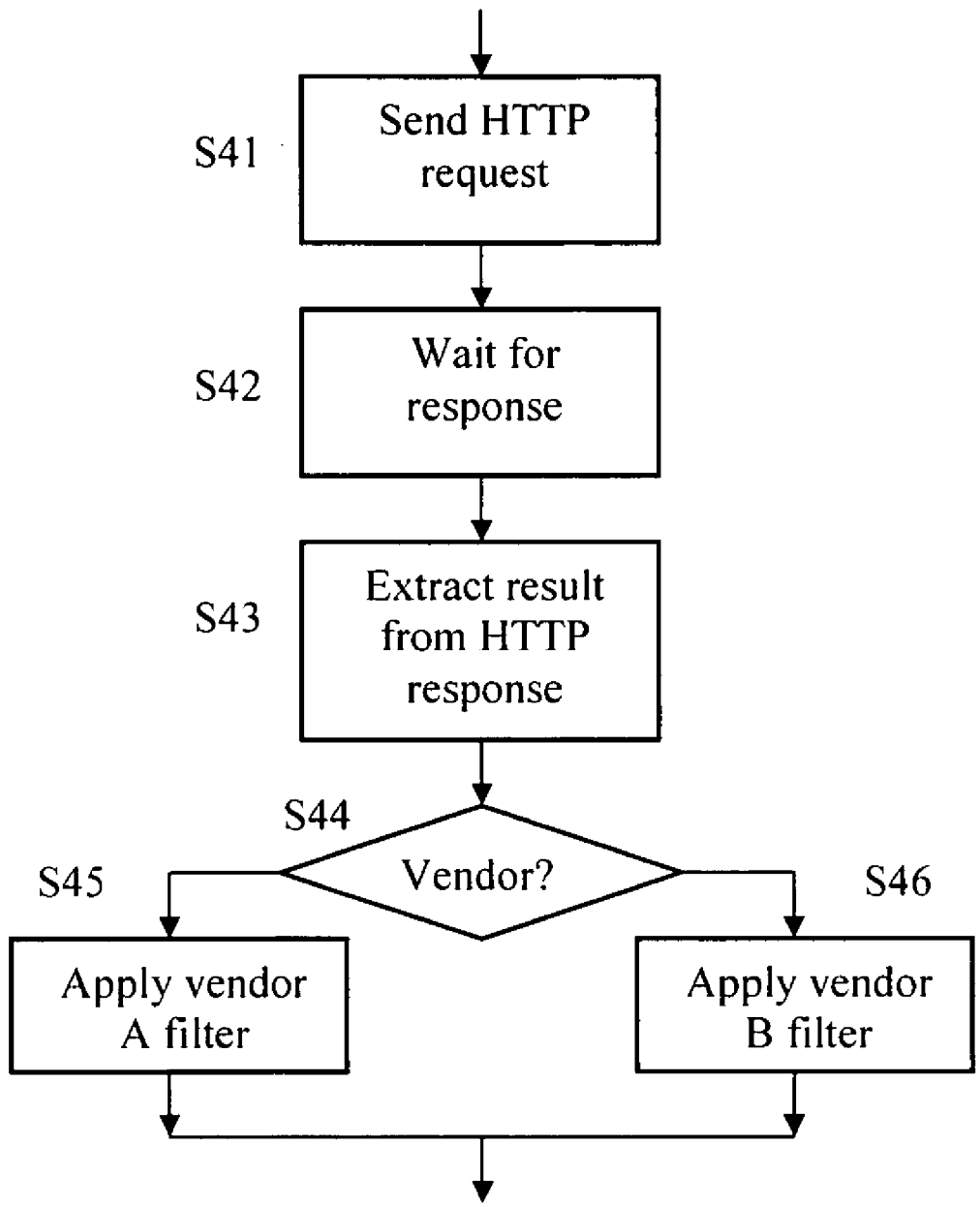
FIG. 4 shows a flow chart showing application logic for communicating with an information source using the HTTP protocol.

The interface type attribute is exemplarily shown in the HTML data above. However, since a HTML/XHTML structured text is returned, other information apart from Type is also returned. In addition, since organization of information in an HTML page is proprietary, the extraction logic varies from vendor to vendor. A filter specific to the device and to the vendor is typically applied to the result to extract the relevant attributes from the result (steps S44-S46), as shown in FIG. 4.

Interfacing with information source 22c leads to similar issues. The application logic is tied to Telnet/CLI semantics and extraction of data from return values is dependent on vendor's proprietary data organization. In the case of Telnet/CLI, the data is either returned as unformatted Telnet text or as formatted text. When formatted to display on a screen, the data is returned in multiple messages and not in any order, and therefore complex processing is required to reformat the data in a structure that can be parsed in a structured manner.

Figure 5:
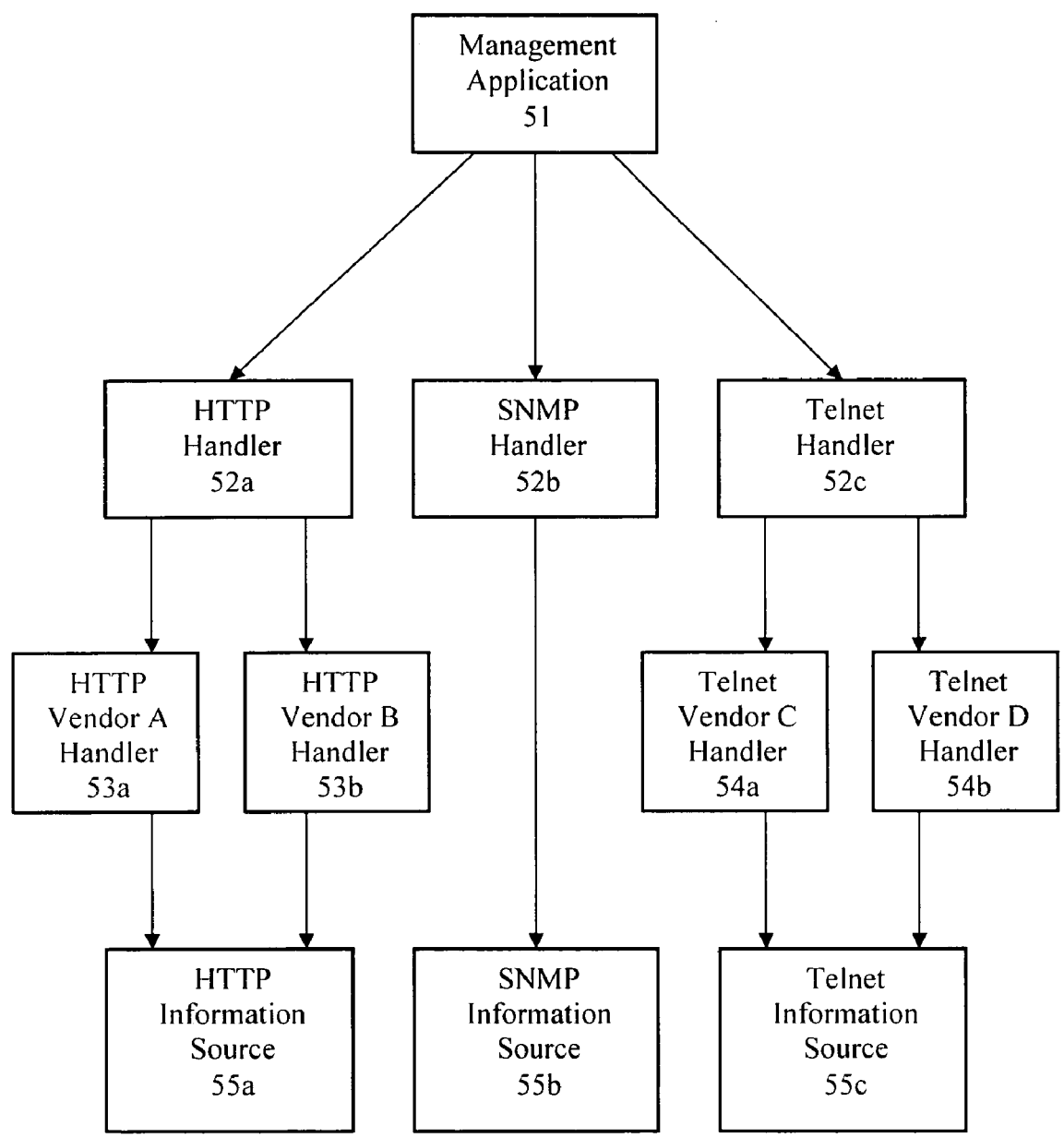
FIG. 5 shows a schematic representation of a communication scheme between a management application, on the one hand, and on the other hand plural information sources, through different handler modules using respective protocols in a heterogeneous environment.

Because management interfaces generally lack commonality between them, a management application typically hard-wires each of the interfaces into the application logic. The application (51) has one module (52a, 52b, and 52c) for each of the interfaces (55a, 55b, and 55c, respectively), with each interface possibly having multiple variants (53a, 53b, 54a, and 54b) depending on the vendors supported, as exemplarily depicted in FIG. 5.

As discussed above, conventional management of information on/in information sources uses the management protocol's native constructs. The native constructs vary in sophistication. SNMP provides some rudimentary constructs, while there are negligible support for constructs in HTTP and Telnet. Sophisticated queries simply cannot be supported by these protocols.

For example, if a subset of attributes spread across multiple locations (for example, tables, forms, etc.) need to be fetched, there is no support from the protocols. Such queries have to be implemented by the application.

Coupled with the proprietary nature of organization of data, query logic varies not only in terms of protocols but also different vendors.

Figure 6:
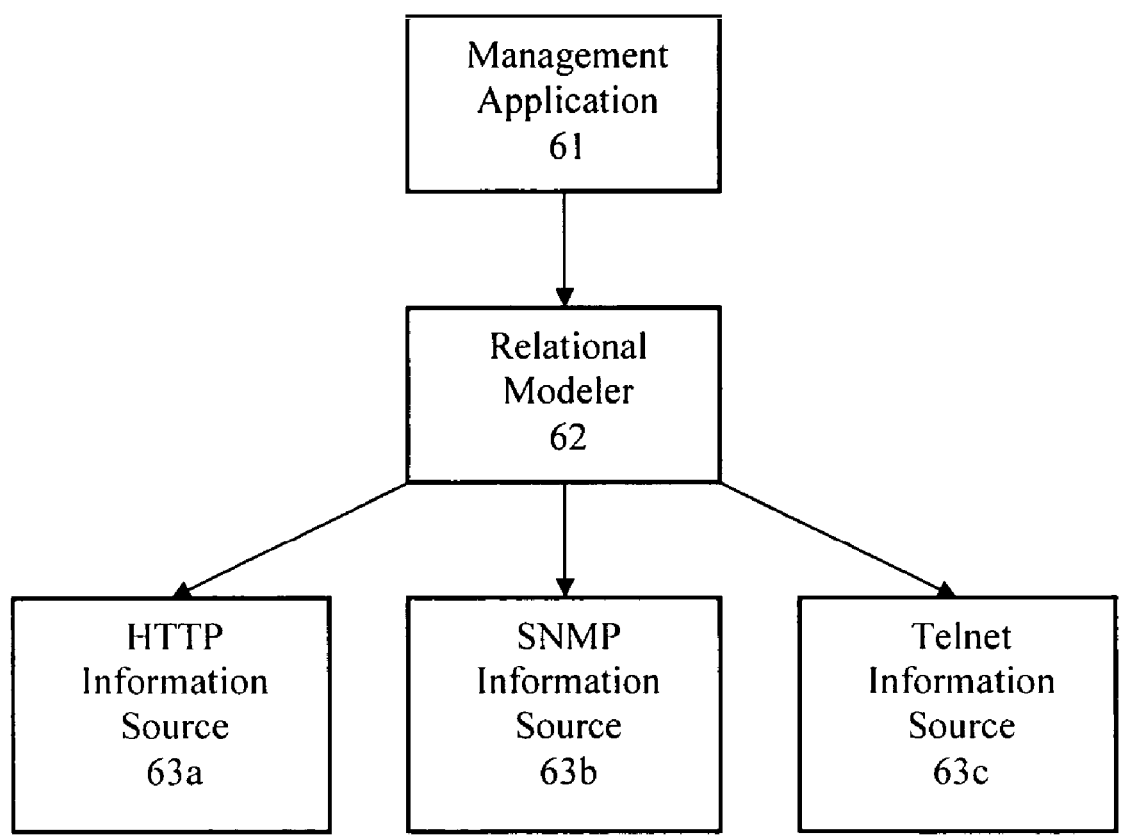
FIG. 6 shows a schematic representation of a communication scheme between a management application, on the one hand, and on the other hand plural information sources in a heterogeneous environment, through a relational modeler, in accordance with one embodiment of the present application.

The subject management tools address the issues regarding supporting management information sources in a multi-vendor, multi-management interfaces. The management information source (63a, 63b, and 63c) is modeled as a virtual relational database by the relational modeler 62. Management applications (61) map the information requests on this relational model, as shown in FIG. 6.

According to one exemplary embodiment, applications can use SQL-like constructs to formulate queries, and thereby leverages the robustness and power of SQL. Each SQL-like query may be implemented as a transaction of actual protocol messages.

Management applications may be provided a unified view on all of the information sources, regardless of the native support for management protocols, through a relational modeler, which provides a relational model of the information source. Also, the relational modeler may provide a SQL-like language for accessing information. The language can support any arbitrary access logic. Thus, tight coupling of applications to management protocol's access mechanism and inadequate support of query constructs are avoided by the relational modeler.

The relational modeler effectively manages multi-vendor multi-protocol management environment. The relational modeler is scalable. The relational modeler is independent of vendor or protocol information. The relational modeler is data driven and specific management attributes and protocol are expressed as XML data.

Figure 7:
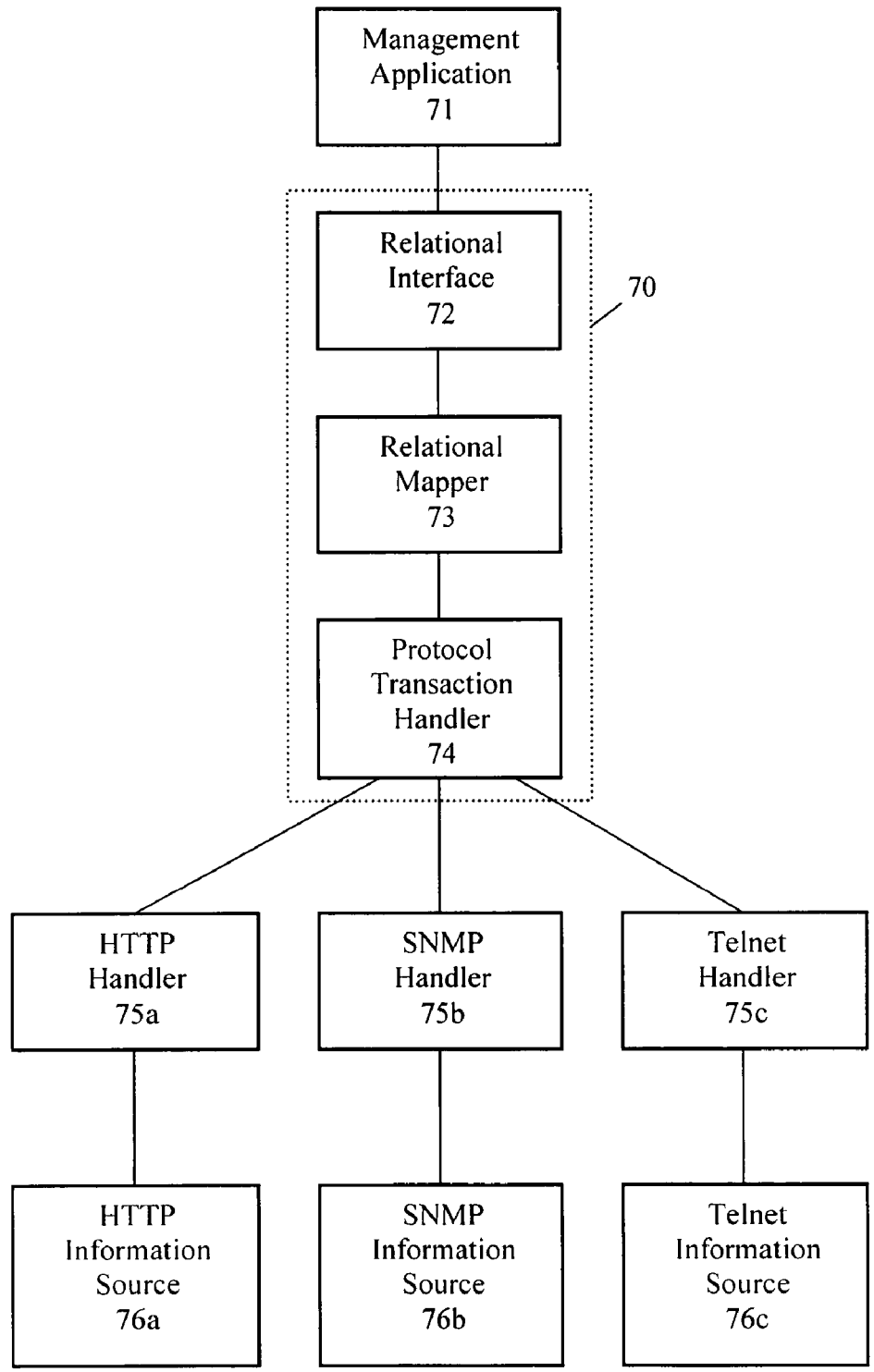
FIG. 7 shows a block diagram of a relational modeler, in accordance with one embodiment of the present application, through which a management application communicates with plural information sources in a heterogeneous environment.

A relational modeler apparatus 70, according to one embodiment (FIG. 7), includes a relational interface 72, a relational mapper 73 and a protocol transaction handler 74. The relational interface 72 provides SQL-like constructs to management applications. The relational mapper 73 bridges the relational constructs to the native constructs.

For example, a relational query emanating from management application 71 is mapped onto a SNMP request with attributes expressed in the dotted decimal notation, as normally provided. The mapping process of the relational mapper 73 produces a set of native protocol messages and this set may include multiple protocol statements. If an application query has attributes managed through SNMP and Telnet/CLI, then the query is translated into a set of two distinct native protocol messages, one for SNMP and the other for Telnet/CLI.

The set of native protocol messages is handled as a transaction by the protocol transaction handler component 74 through the appropriate handlers (75a, 75b and 75c) with the information sources (76a, 76b and 76c). After completion of the transaction, the protocol transaction handler component 74 constructs the result and returns it to the application 71.

The following XML snippet demonstrates a select query using different protocols. The first part of the XML definition is the actual definition of what the table looks like (relational mapping) in terms of the protocol. The "<declaration></declaration>" section essentially defines the "how", while the "<command></command>" defines the action, that is to be performed (for example, select, update, insert, delete). The declaration section can be used in multiple management commands, i.e. the management command uses the declaration section.

```
<Declaration>
<Table Name = "table1">                                               [1]
    <TableAccess Protocol = "SNMP" version="1.0">                     [2]
    <StateMachine>                                                    [3]
        <State Name = "get">                                          [4]
            1.3.6.1.4.1
        </State>
    </StateMachine>
    </TableAccess>
    <Attribute Name = "macAddr" DataType = "macAddress"
AttrId = "1" IsOutBound = "true"/>                                    [5]
    <Attribute Name = "ipAddr" DataType = "ipAddress"
AttrId = "2" IsOutBound = "true"/>                                    [5]
    <Attribute Name = "awcTpFdbClassID" DataType = "int"
AttrId = "3" IsOutBound = "false"/>                                   [5]
</Table>
<Table Name = "table2">                                               [1]
    <TableAccess Protocol = "HTTP" Filter="DOM" version="3.0">        [6]
    <StateMachine>
        <State Name = "get">
            "fullyqualifiedname.htm"
        </State>
    </StateMachine>
    </TableAccess>
    <Attribute Name = "macAddr" DataType = "macAddress"
AttrId = "macAddr" IsOutBound = "true" >                              [7]
        <Filter Type = "RegExp">                                      [8]
            regular-expression
        </Filter>
    </Attribute>
    <Attribute Name = "ipAddr" DataType = "ipAddress"
AttrId = "ipAddr" IsOutBound = "true"/>
        <Filter Type = "RegExp">
            regular-expression
        </Filter>
    </Attribute>
</Table>
</Declaration>
<Command Type="get" numparam=3 parameter1="%hostid%"
parameter2="%hostid1%"                                                [9]
    <parameter3="%interfaceid%">
<Select>                                                              [10]
        <Attribute Name="macAddr" TableName="table1"
host="%hostid%"/>
        <Attribute Name="ipAddr" TableName="table2"
host="%hostid1%"/>
</Select>
<From>                                                                [11]
    <Table Name="table1" HostID=%host%/>
    <Table Name="table2" HostID=%host%/>
</From>
<Where>                                                               [12]
<Attribute Name = "macAddr" TableName = "table1"                      [13]
Alias = "x"/>
<Attribute Name = "macAddr" TableName = "table2"
Alias = "y"/>
<Attribute Name = "awcTpFdbClassID" TableName = "table1"
Alias = "z"/>
<Expression>                                                          [14]
    -- MathML notation
    <reln> <eq/>
        <ci>
            z
        </ci>
        <cn type = "int">
            "%interfaceid%"
        </cn>
    </reln>
    <and/>
    <reln><eq/>
        <ci>
            y
        </ci>
        <ci>
            x
        </ci>
    </reln>
</Expression>
</Where>
</Command>
```

Note [1] defines a relational table name.

Note [2] defines the protocol that is to be used to access the table (for example, SNMP v1).

Note [3] defines the state machine to access the table. A state machine is used since multiple states are transversed under certain protocols before the data of interest is accessible (for example, a series of Telnet commands are executed before the data of interest is available).

Note [4] defines one or more states in the state machine.

Note [5] defines the attributes that are to be included in the relational table and how they are accessed in terms of the protocol.

In note [6], additional filters are applied, under certain protocols, such as HTTP and Telnet, to the retrieved data before the table is mapped.

Note [7] flags a more complex attribute, since it contains an additional filter.

Under note [8], the filter defines how to extract the relevant data from the filtered data.

Note [9] is an example of a management command. Multiple commands can be defined against the relational models defined in the declaration section. The command also has a set of parameters that are used by the query.

Under note [10], an SQL-like select statement is defined. Each attribute in the select statement defines the "table" from which the relevant attribute comes.

Note [11] defines the tables in the declaration section that are to be used. The information in the from section is used to construct the protocol specific transactions.

Under note [12], the where clause defines the "join" and the query conditions. In this example, MATHML is used to express the conditions.

Under note [13], a set of aliases are pre-defined for each attribute that is to be included the where clause expression.

Note [14] corresponds to the expression in terms of the attribute aliases and any parameters passed in.

In the XML example described above, the management application command comprises the <Command></Command> block. The command block is constructed using an SQL-like statement using Select-From-Where clauses. The Select clause specifies the list of attributes, the From clause specifies the location of the table or HTML page which includes these attributes, and the Where clause specifies any additional conditions to be satisfied on the result. Vendor and protocol specific information is not included in the command block. This is an example of the interfaces provided by relational interface 72 in FIG. 7.

The relational mapper 73 uses the <Declaration></Declaration> block. This block has a mapping between every Table used in the command block and the corresponding location identified in native protocol interface. For example, table 1 used in the command block is actually mapped to a table identified in SNMP with identifier 1.3.6.1.4.1. Similarly, attributes used in the command block are mapped to their native identifier. The relation mapper 73 uses this information and constructs a set or transaction of native management protocol commands and delivers it to the protocol transaction handler 74 for execution. For each information source, a management definition is expressed in the XML format. This enables the relational modeler to be data driven and fully independent of vendor and protocol types.

The above specific embodiments are illustrative, and many variations can be introduced on these embodiments without departing from the spirit of the disclosure or from the scope of the appended claims. Elements and/or features of different illustrative embodiments may be combined with and/or substituted for each other within the scope of the disclosure and the appended claims.

For example, although exemplary embodiments are described herein under the context of network management, it should be appreciated that the tools of this application can be adapted for other system management applications in which data is fetched across a network.

As another example, although a relational model using a SQL-like query language is described exemplarily, an object model corresponding to other query languages, such as OQL (Object Query Language), may be used as well.

Additional variations may be apparent to one of ordinary skill in the art from reading the following U.S. provisional applications, which are incorporated in their entireties herein by reference:

(a) U.S. Provisional Application No. 60/454,966, filed Mar. 14, 2003 and entitled "RELATIONAL MODEL FOR MANAGEMENT INFORMATION IN NETWORK DEVICES"; and (b) U.S. Provisional Application No. 60/452,663, filed Mar. 7, 2003 and entitled "MOBILITY MANAGEMENT IN WIRELESS NETWORK".

What is claimed is:

1. An apparatus for network management in a heterogeneous environment, comprising:

a relational interface embodied in a machine-readable non-transitory medium and when executed by an electronic processor configured to receive a relational query from a software application requesting network management information from a specified network device, the network management information including interface information allowing the software application to monitor, control, and configure devices on a network remotely via the network;

a relational mapper embodied in a machine-readable non-transitory medium and configured to translate the relational query requesting network management information received through the relational interface from the software application, to native protocol messages according to an access protocol associated with the network device;

a plurality of handlers embodied in a machine-readable non-transitory medium, the plurality of handlers comprising a Hypertext Transfer Protocol handler, a Simple Network Management Protocol handler, and a Telnet handler; and a protocol transaction handler embodied in a machine-readable non-transitory medium and configured to select a handler from the plurality of handlers according to the access protocol associated with the network device, wherein the selected handler is configured to:
handle the native protocol messages as a transaction with the network device,
return a result of the transaction to the software application; and
extract the interface information from the result of the transaction by applying a filter, the filter selected based on the network device and a vendor associated with the network device, the filter compatible with a proprietary data organization associated with the vendor.

2. The apparatus of claim 1, wherein the relational mapper includes a relational model of the network device.

3. The apparatus of claim 1, wherein the relational mapper is configured to translate a query to plural messages corresponding to plural access protocols.

4. The apparatus of claim 1, wherein the relational mapper is expandable to receive queries directed to additional network devices which use other protocols different from said access protocol, transparent to said software application.

5. The apparatus of claim 1, wherein the collection of information of the network device is viewed as a relational database.

6. The apparatus of claim 1, wherein the relational query is independent of management and access protocols.

7. The apparatus of claim 1, wherein the translation of the relational query to native protocol messages is an abstraction transparent to said software application.

8. The apparatus of claim 1, wherein a form of the relational query does not depend on the access protocol to which the relational query is to be translated.

9. A computer data signal embodied in a machine-readable non-transitory medium, for network management in a heterogeneous environment, comprising:

a first segment including relational interface code to receive a relational query from a software application requesting network management information from a specified network device, the network management information including interface information allowing the software application to monitor, control, and configure devices on a network remotely via the network;

a second segment including relational mapper code to translate the relational query requesting network management information received from the software application, to native protocol messages according to an access protocol associated with the network device; and a third segment comprising a Hypertext Transfer Protocol handler code, a Simple Network Management Protocol handler code, and Telnet handler code, the third segment further including protocol transaction handler code to select handler code from the Hypertext Transfer Protocol handler code, the Simple Network Management Protocol handler code, and the Telnet handler code according to the access protocol associated with the network device, wherein the selected handler code is configured to:
handle the native protocol messages as a transaction with the network device,
return a result of the transaction to the software application; and
extract the interface information from the result of the transaction by applying a filter, the filter selected based on the network device and a vendor associated with the network device, the filter compatible with a proprietary data organization associated with the vendor.

10. A method for network management in a heterogeneous environment, comprising:

receiving a relational query from a software application requesting network management information from a specified network device, the network management information including interface information allowing the software application to monitor, control, and configure devices on a network remotely via the network;

translating the relational query received from the software application, to native protocol messages according to an access protocol associated with the network device;

storing a plurality of handlers embodied in a machine-readable non-transitory medium, the plurality of handlers comprising a Hypertext Transfer Protocol handler, a Simple Network Management Protocol handler, and a Telnet handler; and selecting a handler from the plurality of handlers according to the access protocol associated with the network device, wherein the selected handler:

handles the native protocol messages as a transaction with the network device, returns a result of the transaction to the software application; and extracts the interface information from the result of the transaction by applying a filter, the filter selected based on the network device and a vendor associated with the network device, the filter compatible with a proprietary data organization associated with the vendor.

11. The apparatus of claim 1, wherein the access protocol associated with the network device is selected from a group consisting of:

Simple Network Management Protocol;
Common Management Information Protocol;
Command Line Interface;
Hypertext Transfer Protocol;
Structured Query Language; and
Simple Object Access Protocol.

12. The apparatus of claim 1, further comprising the relational mapper configured to translate the relational query, in the form of Structured Query Language, received through the relational interface from the software application, to native protocol messages according to an access protocol, in the form of Simple Network Management Protocol, associated with the network device.

13. The computer data signal of claim 9, wherein the access protocol associated with the network device is selected from a group consisting of:

Simple Network Management Protocol;
Common Management Information Protocol;
Command Line Interface;
Hypertext Transfer Protocol;
Structured Query Language; and
Simple Object Access Protocol.

14. The computer data signal of claim 9, further comprising the second segment including relational mapper code to translate the relational query, in the form of Structured Query Language, received from the software application, to native protocol messages according to an access protocol, in the form of Simple Network Management Protocol, associated with the network device.

15. The method of claim 10, wherein the access protocol associated with the network device is selected from a group consisting of:

Simple Network Management Protocol;
Common Management Information Protocol;
Command Line Interface;
Hypertext Transfer Protocol;
Structured Query Language; and
Simple Object Access Protocol.

16. The method of claim 10, wherein translating the relational query received from the software application, to native protocol messages according to an access protocol associated with the network device comprises translating the relational query, in the form of Structured Query Language, received from the software application, to native protocol messages according to an access protocol, in the form of Simple Network Management Protocol, associated with the network device.

17. A computer system, comprising:
an electronic processor; and
a non-transitory program storage device readable by the computer system, tangibly embodying a program of instructions executable by the processor to:

receive a relational query from a software application requesting network management information from a specified network device, the network management information including interface information allowing the software application to monitor, control, and configure devices on a network remotely via the network allowing the software application to monitor, control, and configure devices on a network remotely via the network;

translate the relational query requesting network management information received from the software application, to native protocol messages according to an access protocol associated with the network device;

store a plurality of handlers embodied in a machine-readable non-transitory medium, the plurality of handlers comprising a Hypertext Transfer Protocol handler, a Simple Network Management Protocol handler, and a Telnet handler; and select a handler from the plurality of handlers according to the access protocol associated with the network device, wherein the selected handler is configured to:

handle the native protocol messages as a transaction with the network device, return a result of the transaction to the software application, and extract the interface information from the result of the transaction by applying a filter, the filter selected based on the network device and a vendor associated with the network device, the filter compatible with a proprietary data organization associated with the vendor.

18. A non-transitory program storage device readable by a electronic processor, tangibly embodying a program of instructions executable by the electronic processor to:

receive a relational query from a software application requesting network management information from a specified network device, the network management information including interface information allowing the software application to monitor, control, and configure devices on a network remotely via the network;

translate the relational query requesting network management information received from the software application, to native protocol messages according to an access protocol associated with the network device;

store a plurality of handlers embodied in a machine-readable non-transitory medium, the plurality of handlers comprising a Hypertext Transfer Protocol handler, a Simple Network Management Protocol handler, and a Telnet handler; and select a handler from the plurality of handlers according to the access protocol associated with the network device, wherein the selected handler is configured to:

handle the native protocol messages as a transaction with the network device, return a result of the transaction to the software application, and extract the interface information from the result of the transaction by applying a filter, the filter selected based on the network device and a vendor associated with the network device, the filter compatible with a proprietary data organization associated with the vendor.

19. A computer data signal including one or more segments embodied in a machine-readable non-transitory medium which embodies instructions executable by a electronic processor to:

receive a relational query from a software application requesting network management information from a specified network device, the network management information including interface information allowing the software application to monitor, control, and configure devices on a network remotely via the network;

translate the relational query requesting network management information received from the software application, to native protocol messages according to an access protocol associated with the network device;

store a plurality of handlers embodied in a machine-readable non-transitory medium, the plurality of handlers comprising a Hypertext Transfer Protocol handler, a Simple Network Management Protocol handler, and a Telnet handler; and select a handler from the plurality of handlers according to the access protocol associated with the network device, wherein the selected handler is configured to:

handle the native protocol messages as a transaction with the network device, return a result of the transaction to the software application, and extract the interface information from the result of the transaction by applying a filter, the filter selected based on the network device and a vendor associated with the network device, the filter compatible with a proprietary data organization associated with the vendor.

* * * * *